United States Patent

Mühlebach et al.

[11] Patent Number: 5,849,841
[45] Date of Patent: Dec. 15, 1998

[54] CROSSLINKED POLYMERS CONTAINING ESTER OR AMIDE GROUPS

[75] Inventors: Andreas Mühlebach, Belfaux; Beat Müller, Marly, both of Switzerland

[73] Assignee: CIBA Vision Corporation, Duluth, Ga.

[21] Appl. No.: 875,340

[22] PCT Filed: Jan. 22, 1996

[86] PCT No.: PCT/EP96/00246

§ 371 Date: Jul. 30, 1997

§ 102(e) Date: Jul. 30, 1997

[87] PCT Pub. No.: WO96/24075

PCT Pub. Date: Aug. 8, 1996

[30] Foreign Application Priority Data

Feb. 3, 1995 [CH] Switzerland ............... 311/95

[51] Int. Cl.⁶ ................ C08F 8/00; C08F 2/48
[52] U.S. Cl. ............ 525/59; 522/144
[58] Field of Search ............ 525/59; 522/144

[56] References Cited

U.S. PATENT DOCUMENTS

| | | | |
|---|---|---|---|
| 4,347,198 | 8/1982 | Ohkada et al. | 264/2.3 |
| 4,670,506 | 6/1987 | Goldenberg et al. | 525/59 |
| 4,978,713 | 12/1990 | Goldenberg | 525/61 |
| 5,508,317 | 4/1996 | Müller | 522/85 |

FOREIGN PATENT DOCUMENTS

| | | |
|---|---|---|
| 0321403A2 | 12/1988 | European Pat. Off. . |
| 0328340A2 | 2/1989 | European Pat. Off. . |

*Primary Examiner*—Jeffrey T. Smith
*Assistant Examiner*—Wu C. Cheng
*Attorney, Agent, or Firm*—Michael U. Lee; R. Scott Meece

[57] ABSTRACT

The invention relates to a novel process for the production of mouldings, in particular contact lenses, in which a water-soluble, crosslinkable polymer is crosslinked in solution, and to mouldings, in particular contact lenses, obtainable by this process. The present invention likewise relates to novel water-soluble, crosslinkable polymers, in particular those comprising units of formula (III or IIIa), in which $R_1$ and $R_2$, independently of one another, are hydrogen, a $C_1$–$C_8$alkyl group, an aryl group or a cyclohexyl group, where these groups can be monosubstituted or polysubstituted, $R_3$ is hydrogen or a $C_1$–$C_4$ alkyl group, and $R_4$ is an —OH— or —NH— bridge; and to crosslinked polymers made from these novel water-soluble, crosslinkable polymers, to a process for the preparation of the novel water-soluble, crosslinkable polymers and the homopolymers and copolymers obtainable therefrom, to mouldings made from said homopolymers or copolymers, in particular contact lenses made from these homopolymers or copolymers, and to a process for the production of contact lenses using said homopolymers or copolymers.

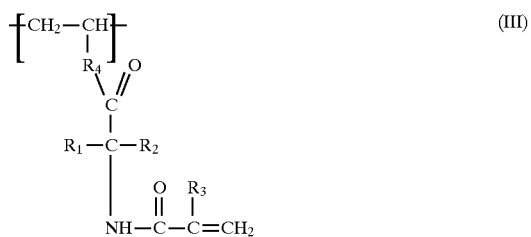

(III)

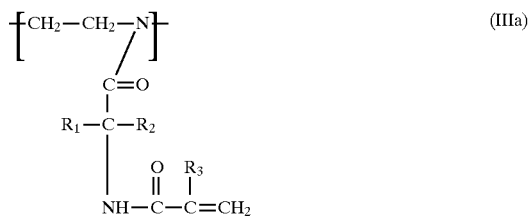

(IIIa)

33 Claims, No Drawings

CROSSLINKED POLYMERS CONTAINING ESTER OR AMIDE GROUPS

The invention relates to a novel process for the production of mouldings, in particular contact lenses, in which a water-soluble, crosslinkable polymer containing, in particular ester-linked or amide-linked crosslinkable acrylate groups is crosslinked, preferably in aqueous solution, and to mouldings, in particular contact lenses, which are obtainable by this process.

The present invention also relates to novel water-soluble, crosslinkable polymers which can be employed in the novel process, in particular those based on starting polymers containing functional groups, for example hydroxyl groups, on the polymer chain or functional groups, for example imino groups, in the polymer chain or functional groups bonded to the polymer skeleton via a bridge, where these functional groups allow covalent bonds to compounds containing a crosslinkable modifier group or another modifier group. These starting polymers are, in particular, polyhydroxyl compounds having a 1,2- and/or 1,3-diol structure, such as polyvinyl alcohol, or hydrolysed copolymers of vinyl acetate, for example copolymers with vinyl chloride, N-vinylpyrrolidone, etc. The invention furthermore relates to crosslinked polymers, either homopolymers or copolymers, made from these novel water-soluble, crosslinkable polymers, to a process for the preparation of the novel water-soluble, crosslinkable polymers and the homopolymers and copolymers obtainable therefrom, to mouldings made from said homopolymers or copolymers, in particular contact lenses made from these homopolymers or copolymers, and to a process for the production of contact lenses using the said homopolymers or copolymers.

Contact lenses based on polyvinyl alcohol have already been disclosed. For example, EP 216 074 discloses contact lenses comprising polyvinyl alcohol containing (meth) acryloyl groups bonded via urethane groups. EP 189 375 describes contact lenses comprising polyvinyl alcohol crosslinked by means of polyepoxides.

Furthermore, some specific acetals containing crosslinkable groups have also already been disclosed. In this connection, we refer, for example, to EP 201 693, EP 215 245 and EP 211 432. EP 201 693 describes, inter alia, acetals of unbranched aldehydes having 2 to 11 carbon atoms carrying a terminal amino group which is substituted by a $C_3$–$C_{24}$olefinically unsaturated organic radical. This organic radical contains a functionality which withdraws electrons from the nitrogen atom, and furthermore the olefinically unsaturated functionality is polymerizable. EP 201 693 also claims products of the reaction of the acetals characterized above with a 1,2-diol, a 1,3-diol, a polyvinyl alcohol or a cellulose. However, such products are not described directly.

By contrast, the present invention relates to water-soluble, crosslinkable polymers which are based on a starting polymer (polymer backbone) which has a functional group which is capable of reacting with an azalactone with ring opening, such as, in particular, an alcoholic hydroxyl group or an amino group, and which preferably have a 1,3-diol, 1,3-amine, 1,3-imine or 1,4-imine skeleton, a certain percentage of these skeleton units being modified to form an ester or amide containing a crosslinkable (alkyl) acrylic acid radical.

The novel crosslinkable, water-soluble polymer is, in particular, a derivative of a polyvinyl alcohol, polyethyleneimine or polyvinylamine having a mean molecular weight of at least about 2000 which comprises from about 0.5 to about 80%, based on the number of hydroxyl groups in the polyvinyl alcohol or the number of imine or amine groups in the polyethyleneimine or polyvinylamine respectively, of units of the formula III or IIIa

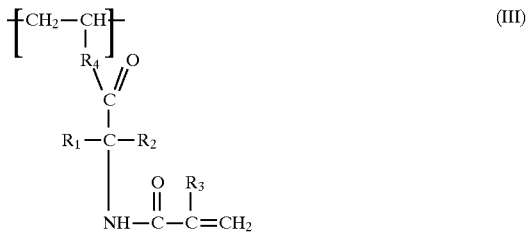

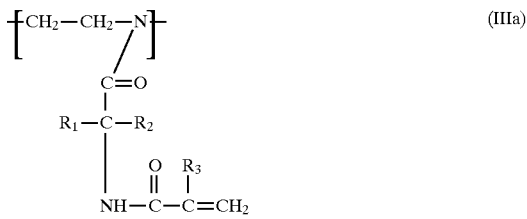

in which $R_1$ and $R_2$ embody amino acid radicals and are, independently of one another, hydrogen, a $C_1$–$C_8$alkyl group, an aryl group, or a cyclohexyl group, where these groups are unsubstituted, monosubstituted or polysubstituted;
$R_3$ is hydrogen or a $C_1$–$C_4$alkyl group, in particular a $CH_3$ group, and
$R_4$ is an —O— or —NH— bridge.

In a preferred embodiment, $R_4$ is —O—, i.e. an ester link. Particular preference is given to a radical of the formula IIIb

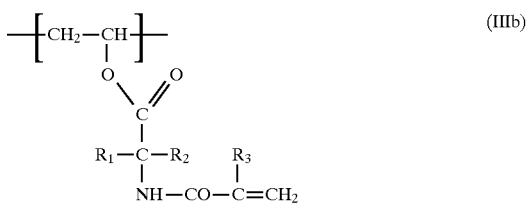

in which the symbols $R_1$, $R_2$ and $R_3$ are as defined under the formula III, particular preference being given to a radical of the formula IIIb in which $R_1$ and $R_2$ are methyl and $R_3$ is hydrogen.

The novel water-soluble, crosslinkable polymer is therefore, in particular, a derivative of a polyvinyl alcohol having a molecular weight of at least about 2000 which comprises from about 0.5 to about 80%, based on the number of hydroxyl groups in the polyvinyl alcohol, of units of the formula IIIb.

$R_1$ and $R_2$ as a $C_1$–$C_8$alkyl group are linear or branched $C_1$–$C_8$alkyl and are, for example, the following groups: octyl, hexyl, pentyl, butyl, propyl, ethyl, methyl, 2-propyl, 2-butyl or 3-pentyl. $R_1$ is preferably hydrogen or $CH_3$, and $R_2$ is preferably a $C_1$–$C_4$alkyl group.

$R_1$ and $R_2$ as aryl are preferably phenyl.

All these groups can be substituted, examples of suitable substituents being the following: —COOH, —OH, —SH, $C_1$–$C_4$alkoxy (such as methoxy, ethoxy, propoxy, butoxy, isobutoxy), —NO$_2$, —NH$_2$, —NH($C_1$–$C_4$alkyl), —NH—CO—NH$_2$, —N($C_1$–$C_4$alkyl)$_2$, phenyl (unsubstituted or substituted by, for example, —OH or halogen, such as Cl, Br or in particular I), —S($C_1$–$C_4$alkyl), 5- or 6-membered heterocyclic rings, such as, in particular, indole or imidazole, —NH—C(NH)—NH$_2$, phenoxyphenyl (unsubstituted or substituted by, for example, —OH or halogen, such as Cl, Br or in particular I), an olefinic group, such as vinyl, and CO—NH—C(NH)—NH$_2$.

The novel water-soluble, crosslinkable polymers are preferably derivatives of polyvinyl alcohol having a mean molecular weight of at least about 2000 which comprises, in particular, from about 1 to 25%, particularly preferably from about 1 to 12%, based on the number of hydroxyl groups in the polyvinyl alcohol, of units of the formula III in which $R_4$ is an —O— bridge.

Novel water-soluble, crosslinkable polymers which are intended for the production of contact lenses comprise, in particular, from about 2 to 15%, especially from 2 to about 12%, based on the number of hydroxyl groups in the polyvinyl alcohol, of units of the formula III in which $R_4$ is an —O— bridge.

Polyvinyl alcohols, polyethyleneimines and polyvinylamines which can be derivatized, for example, in accordance with the invention preferably have a molecular weight of at least 10,000. The upper limit to their mean molecular weight is up to 1,000,000. They preferably have a mean molecular weight of up to 300,000, in particular of up to 100,000, very particularly preferably of up to about 50,000 (number average values).

The polyvinyl alcohols which are suitable for the purposes of the invention, usually have, for example, principally a poly(2-hydroxyethylene) structure. However, they can also contain hydroxyl groups in the form of 1,2-glycols, such as copolymer units of 1,2-dihydroxyethylene, as can be obtained, for example, by alkaline hydrolysis of vinyl acetate-vinylene carbonate copolymers.

In addition, the polymers derivatized in accordance with the invention, in particular polyvinyl alcohols, can also contain, for example up to 60%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, vinyl acetate, vinyl ether, hydroxyethyl acrylate, allyl alcohol, maleic anhydride, maleimide, ethylene glycol derivatives or aldehyde polymers, polymers containing OH groups, polysaccharides, proteins, anhydride polymers, epoxides, water glass or copolymers with OH—styrene.

Polyvinyl alcohols (PVA) which can be used as starting polymers are commercially available polyvinyl alcohols, for example Vinol® 107 from Air Products (MW=22,000 to 31,000, 98–98.8% hydrolysed), Polysciences 4397 (MW= 25,000, 98.5% hydrolysed), BF 14 from Chan Chun, Elvanol® 90-50 from DuPont and UF-120 from Unitika. Other producers are, for example, Nippon Gohsei (Gohsenol®), Monsanto (Gelvatol®), Wacker (Polyviol®) or the Japanese producers Kuraray, Denki and Shin-Etsu. However, it is advantageous to use Mowiol® products from Hoechst, in particular those of the 3-83, 4-88, 4-98, 6-88, 6-98, 8-88, 8-98, 10-98, 20-98, 26-88 and 40-88 type.

The PVAs are prepared by basic or acidic, partial or virtually complete hydrolysis of polyvinyl acetate.

As mentioned above, it is also possible to use copolymers of hydrolysed or partially hydrolysed vinyl acetate, which are obtainable, for example, as hydrolysed ethylene-vinyl acetate (EVA), or vinyl chloride-vinyl acetate, N-vinylpyrrolidone-vinyl acetate and maleic anhydride-vinyl acetate.

Polyvinyl alcohol is usually prepared by hydrolysis of the corresponding homopolymeric polyvinyl acetate. In a preferred embodiment, the polyvinyl alcohol derivatized in accordance with the invention comprises less than 50% of polyvinyl acetate units, in particular less than 20% of polyvinyl acetate units. Preferred amounts of residual acetate units in the polyvinyl alcohol derivatized in accordance with the invention are, based on the total amount of vinyl alcohol units and acetate units, from about 2 to 20%, preferably from about 2 to 16%, in particular from 2 to 12%, especially from 0.5 to 3%.

The water-soluble, crosslinkable polymers comprising units of the formula III or IIIa can be prepared in a manner known per se. For example, a polyvinyl alcohol or a polyethyleneimine or a polyvinylamine having a molecular weight of at least about 2000 which comprises units of the formula I $$—CH(OH)—CH_2—, \quad —CH_2—CH_2—NH— \text{ or } —CH_2—CH(NH)_2— \quad (I)$$

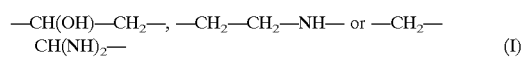

can be reacted with from about 0.5 to 80%, based on the number of hydroxyl, imine or amine groups, of an azalactone of the formula II

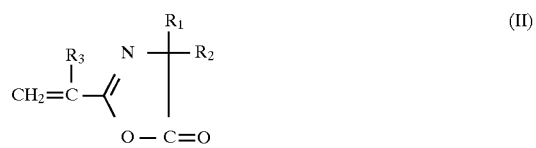

in which $R_1$, $R_2$ and $R_3$ are as defined under the formula III, at elevated temperature in a suitable organic solvent, if desired in the presence of a catalyst, with opening of the azalactone ring.

The term elevated temperature here is taken to mean, in particular, a range of from about 55° C. to 75° C., especially 65° C.

Suitable organic solvents are those which dissolve the polymer backbone. If a polyvinyl alcohol backbone (homopolymer or copolymer) is used, these are, in particular, aprotic polar solvents, for example formamide, dimethylformamide (DMF), hexamethylphosphoric triamide (HMPT) and especially dimethyl sulfoxide (DMSO); furthermore pyridine, nitromethane, acetonitrile, nitrobenzene, chlorobenzene, trichloromethane or dioxane.

Catalysts which can be used if desired are, for example, tertiary amines, such as triethylamine, and organotin salts, such as dibutyltin dilaurate. The preferred catalyst is 1,8-diazabicyclo[5.4.0]undec-7-ene (DBU).

Some of the compounds of the formula II are known, for example, from Angew. Makromol. Chemie 11 (1990), 109 in combination with J. Polym. Sci. Polym. Chem. Ed. 24 (1986), 1, and can be prepared in a known manner, for example by reacting acryloyl chloride or an ($R_3$) derivative with an amino acid in alkaline medium followed by cyclization with elimination of water, in accordance with the general scheme below:

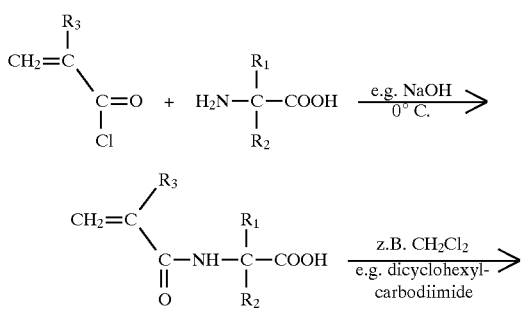

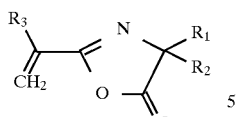

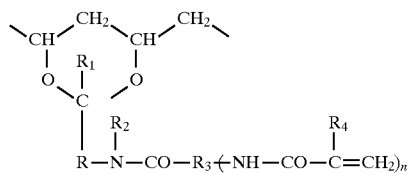

In these formulae, the symbols $R_1$, $R_2$ and $R_3$ are as defined under the formula III.

Suitable amino acids are in particular aliphatic amino acids and aromatic amino acids. Examples which may be mentioned are glycine, alanine, 2-methylalanine, valine, leucine, isoleucine, phenylalanine, tyrosine*, serine*, threonine, cysteine, methionine, tryptophan*, aspartic acid*, glutamic acid*, arginine*, lysine*, histidine*, α-aminobutyric acid, thyroxine, diiodtyrosine, β-thiovaline*, γ-methyleneglutamic acid*, α,γ-diaminobutyric acid*, ornithine*, hydroxylysine*, citrulline* and canavanine*. (*means that the —OH or —NH$_2$ terminal in this amino acid must first be protected, for example using a conventional peptide chemistry protecting group, before conversion to the azalactone).

Particularly preferred amino acids are aliphatic amino acids, in particular alanine and 2-methylalanine.

The water-soluble, crosslinkable polymers comprising units of the formula III or IIIa are then isolated as solids, for example by precipitation in acetone.

Surprisingly, the water-soluble, crosslinkable polymers comprising units of the formula III or IIIa are extremely stable. This is unexpected to the person skilled in the art since higher-functional acrylates, for example, usually require stabilization. If such compounds are not stabilized, rapid polymerization usually occurs. However, spontaneous crosslinking due to homopolymerization does not occur with the novel water-soluble, crosslinkable polymers. These polymers can, in addition, be purified in a manner known per se, for example as mentioned by precipitation with acetone, dialysis or ultrafiltration, particular preference being given to ultrafiltration. This purification operation allows the water-soluble, crosslinkable polymers comprising units of the formula III or IIIa to be obtained in extremely pure form, for example as concentrated aqueous solutions, which are free or at least substantially free from reaction products, such as salts, and starting materials, or other non-polymeric constituents.

The preferred method for the purification of the novel water-soluble, crosslinkable polymers comprising units of the formula III or IIIa, namely ultrafiltration, can be carried out in a manner known per se. It is possible to carry out the ultrafiltration repeatedly, for example from two to ten times. Alternatively, the ultrafiltration can also be carried out continuously until the desired degree of purity has been achieved. The desired degree of purity can in principle be as great as desired. A suitable measure of the degree of purity is, for example, the NMR spectrum of the solution in DMSO or the elemental analysis ($N_2$-content).

In addition to the units of the formula III or IIIa, the novel water-soluble, crosslinkable polymers can also comprise further modifier units. Of the many possibilities for such modifiers, the following are mentioned by way of example:

Further units containing crosslinkable groups are, for example, those of the formula A in which R is a linear or branched bivalent radical of a $C_1$–$C_2$ alkane, preferably of a $C_1$–$C_6$alkane, $R_1$ is hydrogen, a $C_1$–$C_6$alkyl group or a cycloalkyl group, preferably a cyclohexyl group, $R_2$ is hydrogen or a $C_1$–$C_6$alkyl radical, $R_3$ is the

group if n=0, or the

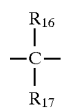

bridge if n=1, $R_4$ is hydrogen or $C_1$–$C_4$alkyl, n is 0 or 1, preferably 0, and $R_{16}$ and $R_{17}$, independently of one another, are hydrogen, linear or branched $C_1$–$C_8$alkyl, aryl, preferably phenyl, or cyclohexyl;

or of the formula B

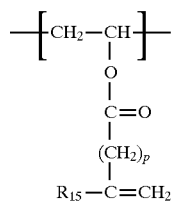

in which $R_{15}$ is hydrogen or a $C_1$–$C_4$alkyl group, in particular $CH_3$, and p is from zero to 6, preferably from zero to 2, in particular zero.

Units which contain a bound photoinitiator are, in particular, those of the formula C

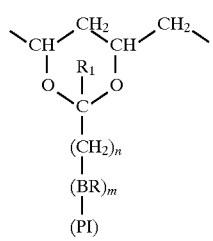

in which

BR is an

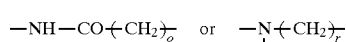

bridge or a quaternary salt thereof which has the formula

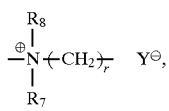

PI is the radical of a photoinitiator from the class consisting of the benzoins, such as benzoin ethers, for example benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal; anthraquinones, such as 2-methylanthraquinone, 2-ethylanthraquinone, 2-tert-butyl anthraquinone, 1-chloroanthraquinone and 2-amylanthraquinone; furthermore benzophenones, such as benzophenone and 4,4'-bis(N,N'-dimethylamino) benzophenone; thioxanthones and xanthones; acridine derivatives; phenazine derivatives; quinoxaline derivatives; and 1-aminophenyl ketones and in particular 1-hydroxyphenyl ketones, in particular those of the formula

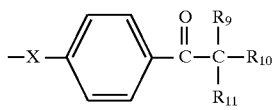

in which
X is —O—, —S— or —N($R_{12}$)—,
Y is a counterion, such as $H_2SO_4^\ominus$, $F^\ominus$, $Cl^\ominus$, $Br^\ominus$, $I^\ominus$, $CH_3COO^\ominus$, $OH^\ominus$, $BF_4^\ominus$ or $H_2PO_4^\ominus$,
$R_3$ is hydrogen, a $C_1$–$C_6$alkyl group or a cycloalkyl group,
$R_7$ is hydrogen; unsubstituted or substituted, linear or branched $C_1$–$C_{12}$alkyl; the —$(CH_2)_r$—PI group or the —CO—$R_{13}$ group, in which $R_{13}$ is linear or branched $C_1$–$C_6$alkyl which is unsubstituted or substituted by —COOH or acrylamide, or an unsubstituted, linear or branched radical of a $C_3$–$C_8$olefin,
$R_8$ is hydrogen, or unsubstituted or substituted, linear or branched $C_1$–$C_4$alkyl so long as $R_7$ is not —CO—$R_{13}$,
$R_9$ is unsubstituted or substituted, linear or branched $C_1$–$C_6$alkyl, unsubstituted or substituted, linear or branched $C_1$–$C_6$alkoxy, a 6-membered carbocyclic or heterocyclic ring, or an unsubstituted linear or branched radical of a $C_3$–$C_8$olefin,
$R_{10}$ is a group of the formula

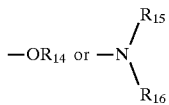

$R_{11}$, is unsubstituted or substituted, linear or branched $C_1$–$C_6$alkyl, a 6-membered carbocyclic or heterocyclic ring, an unsubstituted, linear or branched radical of a $C_3$–$C_8$olefin, or aryl, where
$R_9$ and $R_{11}$, together can also be cyclized to form a 5- or 6-membered carbocyclic ring,
$R_{12}$ is hydrogen or unsubstituted or substituted, linear or branched $C_1$–$C_4$alkyl,
$R_{14}$ is hydrogen or unsubstituted or substituted, linear or branched $C_1$–$C_4$alkyl,
$R_{15}$ and $R_{16}$, independently of one another, are unsubstituted, linear or branched $C_1$–$C_4$alkyl, or $R_{15}$ and $R_{16}$ can be bonded together to form a 5- or 6-membered heterocyclic ring,
m is 0 or 1,
n is a number from 1 to 12,
o is a number from 1 to 6, and
r is a number from 2 to 6,
where substituted radicals are substituted, in particular, by $C_1$–$C_4$alkyl or by $C_1$–$C_4$alkoxy, with the following provisos:
 if the BR bridge is a quaternary salt, n is a number from 2 to 12;
 $R_{14}$ is not hydrogen if $R_9$ is a $C_1$–$C_6$alkoxy radical; and
 $R_7$ is —CO—$R_{13}$ when n=1.
Examples of units containing basic groups are those of the formula D

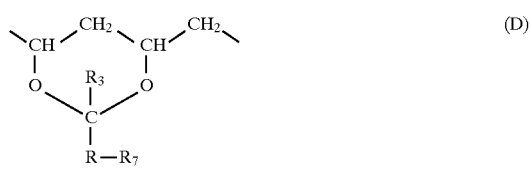

in which R is a linear or branched bivalent radical of a $C_1$–$C_{12}$alkane, and $R_3$ is hydrogen, a $C_1$–$C_6$alkyl group or a cycloalkyl group, and $R_7$ is a basic primary, secondary or tertiary amino group, in particular a secondary or tertiary amino group which is substituted by $C_1$–$C_6$alkyl, or a quaternary amino group of the formula

in which R' is hydrogen or, independently of one another, a $C_1$–$C_{12}$alkyl radical, in particular a $C_1$–$C_4$alkyl radical, and X is a counterion, for example $HSO_4^\ominus$, $F^\ominus$, $Cl^\ominus$, $Br^\ominus$, $I^\ominus$, $CH_3COO^\ominus$, $OH^\ominus$, $BF^\ominus$ or $H_2PO_4^\ominus$.
Examples of units containing acidic groups are those of the formula E

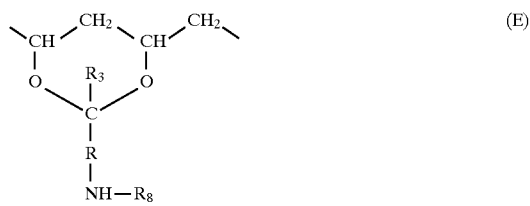

in which R and $R_3$ are as defined under the formula D, and $R_8$ is the radical of a monobasic, dibasic or tribasic aliphatic or aromatic, saturated or unsaturated organic acid.
Examples of units containing crosslinkable groups bonded via urethane or further modifier groups bonded via urethane are those of the formula F or G

in which

U is the

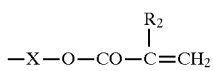

or —Y—NH—CO—O—Z—O—CH=CH$_2$ group,

X is a bridge having 2 to 12 carbon atoms, in particular an aliphatic, cycloaliphatic or aromatic bridge, especially alkylene, cyclohexylene or phenylene, which are unsubstituted or in particular substituted by lower alkyl, $R_2$ is hydrogen or a $C_1$–$C_4$alkyl group, Y is a bridge having 7 to 12 carbon atoms with the same preferences as for X, Z is a $C_2$–$C_{12}$alkylene bridge, which may be interrupted once or more than once by oxygen atoms, and A is an organic radical having 1 to 18 carbon atoms, in particular an aliphatic, cycloaliphatic or aromatic radical, especially alkyl, cycloalkyl or phenyl, which are unsubstituted or in particular substituted by lower alkyl.

Examples of units containing a covalently bonded reactive dye radical are those of the formula H, I, J or K

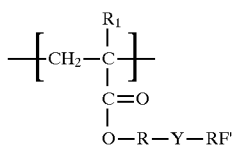 (H)

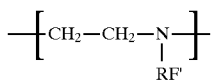 (I)

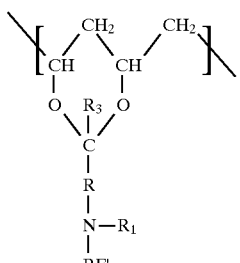 (J)

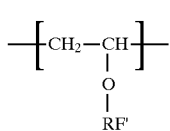 (K)

in which
RF' is a radical of the formula

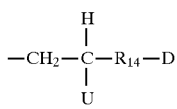

in which
D is the radical of an organic dye,
$R_{14}$ is a divalent electron-withdrawing group,
U is hydrogen or halogen,
R is the divalent radical of a $C_1$–$C_{12}$alkane,
$R_1$ is hydrogen or $C_1$–$C_4$alkyl,
$R_3$ is hydrogen, $C_1$–$C_6$alkyl or cycloalkyl, and
Y is —O— or —N($R_1$)—.

The novel water-soluble, crosslinkable polymers comprising units of the formula III or IIIa and, if desired, further modifier units as described above can be crosslinked in an extremely effective and targeted manner, in particular by photochemical crosslinking.

The present invention therefore furthermore relates to a crosslinked, in particular photocrosslinked polymer which can be obtained by crosslinking a water-soluble, crosslinkable polymer comprising units of the formula III or IIIa in the presence or absence of an additional vinylic comonomer. These crosslinked polymers (hydrogels) preferably obtained by photocrosslinking are insoluble in water.

In the case of photochemical crosslinking (photocrosslinking), it is expedient to add a photoinitiator which is capable of initiating free-radical crosslinking. The crosslinking can then be initiated by actinic or ionizing radiation.

The photocrosslinking is carried out in a suitable solvent. Such solvents are in principle all those which dissolve the polymer backbone, such as polyvinyl alcohol, polyethyleneimine or polyvinylamine, protic and aprotic polar solvents, such as glycols and glycerol and the abovementioned aprotic polar solvents; particular preference is given to water and DMSO.

The photocrosslinking is preferably carried out directly from an aqueous solution of the novel water-soluble, crosslinkable polymers, which can be obtained as a result of the preferred purification step, namely ultrafiltration, if desired after addition of an additional vinylic comonomer.

The process for the preparation of the novel crosslinked polymers from the water-soluble, crosslinkable polymers comprising units of the formula III or IIIa comprises, for example, photocrosslinking an appropriate derivative of a polyvinyl alcohol, polyethyleneimine or polyvinylamine which is capable of reacting with an azalactone of the formula II with ring opening, in particular in essentially pure form, ie. for example, after a single or repeated ultrafiltration, in particular in aqueous solution, in the presence or absence of an additional vinylic comonomer.

The vinylic comonomer which can additionally be used in accordance with the invention in the photocrosslinking can be hydrophilic, hydrophobic or a mixture of hydrophobic and hydrophilic vinylic monomers. Suitable vinylic monomers include, in particular, those which are usually used in the production of contact lenses. The term "hydrophilic vinylic monomer" is taken to mean a monomer which, as a homopolymer, typically gives a polymer which is soluble in water or is capable of absorbing at least 10% by weight of water. Analogously, the term "hydrophobic vinylic monomer" is taken to mean a monomer which, as a homopolymer, typically gives a polymer which is insoluble in water or is capable of absorbing less than 10 percent by weight of water.

In general, from about 0.01 to 80 units of a typical vinylic comonomer react per unit of formula III or IIIa.

If a vinylic comonomer is used, the photocrosslinked novel polymers preferably comprise from about 1 to 15 percent, particularly preferably from about 3 to 8 percent, of units of the formula III or IIIa, based on the number of hydroxyl groups of the polyvinyl alcohol, which are reacted with from about 0.1 to 80 units of the vinylic monomer.

The proportion of vinylic comonomers, if used, is preferably from 0.5 to 80 units per unit of the formula III or IIIa, in particular from 1 to 30 units of vinylic comonomer per unit of the formula III or IIIa, particularly preferably from 5 to 20 units per unit of the formula III or IIIa.

It is furthermore preferred to use a hydrophobic vinylic comonomer or a mixture of a hydrophobic vinylic comonomer and a hydrophilic vinylic comonomer which comprises at least 50 percent by weight of a hydrophobic vinylic comonomer. This allows the mechanical properties of the photocrosslinked polymer to be improved without drastically reducing the water content. However, both conventional hydrophobic vinylic comonomers and conventional hydrophilic vinylic comonomers are in principle suitable for the copolymerization with polyvinyl alcohol, polyethyleneimine and polyvinylamine containing groups of the formula III or IIIa.

Suitable hydrophobic vinylic comonomers include, without this being a comprehensive list, $C_1$–$C_{18}$alkyl acrylates and methacrylates, $C_3$–$C_{18}$alkylacrylamides and -methacrylamides, acrylonitrile, methacrylonitrile, vinyl $C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers in which the alkyl moiety has 1 to 6 carbon atoms, $C_2$–$C_{10}$perfluoroalkyl acrylates and methacrylates and correspondingly partially fluorinated acrylates and methacrylates, $C_3$–$C_{12}$perfluoroalkyl ethylthiocarbonylaminoethyl acrylates and -methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like. Preference is given to, for example, $C_1$–$C_4$alkyl esters of vinylically unsaturated carboxylic acids having 3 to 5 carbon atoms or vinyl esters of carboxylic acids having up to 5 carbon atoms.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris(trimethylsilyloxy)silylpropyl methacrylate, 3-methacryloxypropyl-pentamethyldisiloxane and bis(methacryloxypropyl)tetramethyldisiloxane.

Suitable hydrophilic vinylic comonomers include, without this being a comprehensive list, hydroxy-substituted lower alkyl acrylates and methacrylates, acrylamide, methacrylamide, lower alkylacrylamides and -methacrylamides, methoxylated acrylates and methacrylates, hydroxy-substituted lower alkylacrylamides and -methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- and 4-vinylpyridine, acrylic acid, methacrylic acid, amino- (where the term "amino" also covers quaternary ammonium), mono(lower alkyl)amino- or di(lower alkyl)amino(lower alkyl) acrylates and methacrylates allyl alcohol and the like. Preference is given to, for example, hydroxy-substituted $C_2$–$C_4$alkyl (meth)acrylates, five- to seven-membered N-vinyllactams, N,N-di-$C_1$–$C_4$alkyl(meth)acrylamides and vinylically unsaturated carboxylic acids having a total of 3 to 5 carbon atoms.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide and the like.

Preferred hydrophobic vinylic comonomers are methyl methacrylate and vinyl acetate.

Preferred hydrophilic vinylic comonomers are 2-hydroxyethyl methacrylate, N-vinylpyrrolidone and acrylamide.

The novel water-soluble, crosslinkable polymers comprising units of the formula III or IIIa can be converted into mouldings, in particular contact lenses, in a manner known per se, for example by carrying out the photocrosslinking of the novel water-soluble, crosslinkable polymers in a suitable contact-lens mould. The invention therefore furthermore relates to mouldings essentially comprising a novel water-soluble, crosslinkable polymer. Further examples of novel mouldings, besides contact lenses, are biomedical mouldings and mouldings for specifically ophthalmic purposes, for example intraocular lenses, eye bandages, mouldings which can be used in surgery, such as heart valves, artificial arteries or the like, furthermore films and membranes, for example membranes for diffusion control, photostructurable films for information storage, and photoresist materials, for example membranes and mouldings for etch resists and screen printing resists.

A specific embodiment of the invention relates to contact lenses which comprise a novel crosslinked polymer made from a water-soluble, crosslinkable polymer comprising units of the formula III or IIIa or essentially comprising or consisting of a novel crosslinked polymer. Contact lenses of this type have a range of unusual and extremely advantageous properties, including, for example, excellent compatibility with the human cornea, based on a balanced ratio between water content (about 50–90% by weight, in particular 60–85% by weight), high oxygen permeability and very good mechanical properties, for example transparency, clarity, freedom from stresses and tear strength. In addition, the novel contact lenses have high dimensional stability. Even after autoclaving one or more times at, for example, about 120° C. for about 30–40 minutes, no changes in shape are observed.

It is furthermore emphasized that the novel contact lenses, ie. those comprising a crosslinked polymer made from a crosslinkable polymer comprising units of the formula III or IIIa, can be produced very simply and efficiently compared with the prior art. This is due to a number of factors. Firstly, the starting materials, such as the polymer backbones, are inexpensive to obtain or prepare. Secondly, it is advantageous that the water-soluble, crosslinkable polymers comprising units of the formula III or IIIa are surprisingly stable, so that they can be subjected to very substantial purification. The crosslinking can therefore be carried out using a crosslinkable polymer which requires virtually no subsequent purification, such as, in particular, complex extraction of unpolymerized constituents. Furthermore, the crosslinking can be carried out in purely aqueous solution, so that a subsequent hydration step is unnecessary. Finally, the photocrosslinking takes place within less than 5 minutes, so that the process for the production of the novel contact lenses can be designed to be extremely economical from this point of view too.

All the above advantages naturally apply not only to contact lenses, but also to the other mouldings mentioned. The totality of the various advantageous aspects in the production of novel mouldings results in novel mouldings being particularly suitable as mass-produced articles, for example as contact lenses, which are worn for a short time span (from about 1 to 10 days or from about 1 to 4 days) and are then replaced by new lenses.

The present invention furthermore relates to the production of the novel mouldings, in particular the novel contact lenses. These processes are illustrated below using the example of contact lenses. However, these processes can also be used for the other mouldings mentioned.

The novel contact lenses can be produced in a manner known per se, for example in a conventional spin-casting mould, as described, for example, in U.S. Pat. No. 3,408,429, or by the full-mould process in a static mould, as described, for example, in U.S. Pat. No. 4,347,198.

The present invention also relates to a novel process for the production of polymeric mouldings, in particular contact lenses, in which a water-soluble crosslinkable polymer comprising crosslinkable units of the formula III or IIIa is crosslinked in solution, and to mouldings, in particular contact lenses, obtainable by this process. The mouldings obtainable by crosslinking in this way are insoluble, but swellable, in water.

In detail, this process for the production of mouldings, in particular contact lenses, comprises the following steps:

a) preparation of a preferably essentially aqueous solution of a water-soluble, crosslinkable polymer comprising crosslinkable units of the formula III or IIIa, b) introduction of the resultant solution into a mould, c) initiation of the crosslinking in water or in an organic solvent in which the water-soluble, crosslinkable polymer is dissolved, and d) opening of the mould so that the moulding can be removed.

Unless expressly excluded below, the comments and preferences given above in connection with the water-soluble, crosslinkable polymers comprising units of the formula III or IIIa and the comments and preferences given in connection with the processes for the preparation of polymers and production of mouldings, in particular contact lenses, from these crosslinkable polymers also apply in connection with the above-described process comprising steps a), b), c) and d). This also applies to all the cases in which the comments and preferences in connection with crosslinkable polymers comprising units of the formula III or IIIa can appropriately be applied to the process described above.

The crucial criteria regarding whether a polymer can be employed in the novel process are that the polymer is soluble in water and comprises crosslinkable groups of the formula III or IIIa.

An essentially aqueous solution of a water-soluble, crosslinkable polymer can be prepared in a manner known per se, for example by isolating the water-soluble, crosslinkable polymer, for example in pure form, ie. free from undesired constituents, and dissolving the prepolymer in an essentially aqueous medium.

The criterion that the crosslinkable polymer is soluble in water is, for the purposes of the invention, taken to mean in particular that the water-soluble, crosslinkable polymer is soluble in an essentially aqueous solution at 20° C. in a concentration of from about 3 to 90 percent by weight, preferably from about 5 to 60 percent by weight, in particular from about 10 to 60 percent by weight. If possible in individual cases, crosslinkable polymer concentrations of greater than 90% are also included for the purposes of the invention. Particular preference is given to water-soluble, crosslinkable polymer concentrations in solution of from about 15 to about 50 percent by weight, in particular from about 15 to about 40 percent by weight, for example from about 25 to about 40 percent by weight.

For the purposes of this invention, essentially aqueous solutions of the water-soluble, crosslinkable polymer include in particular solutions in water, in aqueous salt solutions, in particular in aqueous salt solutions having an osmolarity of from about 200 to 450 milliosmol in 1000 ml (unit: mOsm/l), preferably an osmolarity of from about 250 to 350 mOsm/l, in particular about 300 mOsm/l, or in mixtures of water or aqueous salt solutions with physiologically acceptable polar organic solvents, for example glycerol. Preference is given to solutions of the water-soluble, crosslinkable polymers in water alone.

The aqueous salt solutions are advantageously solutions of physiologically acceptable salts, such as buffer salts, for example phosphate salts, which are conventional in the area of contact-lens care, or isotonicizing agents, in particular alkali metal halides, for example sodium chloride, which are conventional in the area of contact-lens care, or solutions of mixtures thereof. An example of a particularly suitable salt solution is an artificial, preferably buffered tear fluid whose pH and osmolarity have been matched to natural tear fluid, for example an unbuffered, preferably buffered for example by phosphate buffer, sodium chloride solution whose osmolarity and pH conform to the osmolarity and pH of human tear fluid.

The above-defined, essentially aqueous solutions of the water-soluble, crosslinkable polymer are preferably pure solutions, ie. those which are free or essentially free from undesired constituents. Particular preference is given to solutions of the water-soluble, crosslinkable polymer in pure water or in an artificial tear fluid as described above.

The viscosity of the solution of the water-soluble, crosslinkable polymer in the essentially aqueous solution is unimportant over broad limits. However, it should preferably be a flowable solution which can be shaped without stresses.

The mean molecular weight of the water-soluble, crosslinkable polymer is likewise unimportant within broad limits. However, the water-soluble, crosslinkable polymer preferably has a mean molecular weight of from about 10,000 to about 200,000.

Suitable polymeric backbones, in addition to polyvinyl alcohol (PVA), polyethyleneimine and polyvinylamine, are materials as have in some cases already been proposed as contact-lens materials, for example polymeric diols other than PVA, polymers comprising saccharides, polymers comprising vinylpyrrolidone, polymers comprising alkyl (meth) acrylates, polymers comprising alkyl (meth)acrylates which are substituted by hydrophilic groups, such as hydroxyl, carboxyl or amino groups, polyalkylene glycols, or copolymers or mixtures thereof.

The crosslinkable polymer (prepolymer) used in accordance with the invention comprises the units containing one or more different crosslinkable group(s) and, if desired, the units containing the further modifier(s), reactive dye radicals and photoinitiator radicals, etc, in a total amount of from about 0.5 to 80%, preferably from 1 to 50%, advantageously from 1 to 25%, in particular from 2 to 15%, particularly preferably from 2 to 10%, based on the number of functional groups in the starting polymer, for example hydroxyl groups in the polyvinyl alcohol.

Polymers (prepolymers) which can be crosslinked in accordance with the invention and are intended for the production of contact lenses comprise, in particular, from about 0.5 to about 25%, especially from about 1 to 15%, particularly preferably from about 2 to 12%, of these units.

As already mentioned, for a water-soluble, crosslinkable polymer to be suitable in the crosslinking process, it is essential that it is a crosslinkable polymer. However, the crosslinkable polymer is uncrosslinked or at least essentially uncrosslinked, so that it is water-soluble.

Furthermore, the water-soluble, crosslinkable polymer is advantageously stable in the uncrosslinked state, so that it can be subjected to purification, as described above in connection with compounds comprising units of the formula III or IIIa. The water-soluble, crosslinkable polymers are preferably employed in the crosslinking process in the form of pure solutions. The water-soluble, crosslinkable polymers can be converted into the form of pure solutions as described below, for example.

The water-soluble, crosslinkable polymers used in the novel process can preferably be purified in a manner known per se, for example by precipitation with organic solvents, such as acetone, filtration and washing, extraction in a suitable solvent, dialysis or ultrafiltration, particular preference being given to ultrafiltration. This purification operation allows the crosslinkable polymers to be obtained in extremely pure form, for example as concentrated aqueous solutions, which are referred to hereinafter as pure or essentially pure. This term is understood to refer to a crosslinkable polymer or to a solution thereof which is free or at least substantially free from undesired constituents.

Undesired constituents in this context are generally all constituents which are physiologically undesired, especially monomeric, oligomeric or polymeric starting compounds used for the preparation of the water-soluble, crosslinkable polymer, or byproducts formed during the preparation of the water-soluble, crosslinkable polymer. Preferred degrees of purity of these constituents are less than 0.01%, in particular less than 0.001%, very particularly preferably less than 0.0001% (1 ppm). It is to be noted, however, that there may be present in the solution, for example by formation as byproducts during the preparation of the water-soluble, crosslinkable polymer, constituents which are not undesired from a physiological point of view, such as for example sodium chloride. Preferred degrees of purity of these constituents are less than 1%, in particular less than 0.1%, very particularly preferably less than 0.01%. In most cases such levels of constituents may be obtained by applying 3 to 4 repeated ultrafiltration cycles.

The preferred process for the purification of the water-soluble, crosslinkable polymers used in the crosslinking process, namely ultrafiltration, can be carried out in a manner known per se. The ultrafiltration can be carried out repeatedly, for example from two to ten times. Alternatively, the ultrafiltration can also be carried out continuously until the desired degree of purity has been achieved. The desired degree of purity can in principle be chosen to be as great as desired.

In a preferred embodiment of the crosslinking process, an essentially aqueous solution of the water-soluble, crosslinkable polymer which is essentially free from undesired constituents, for example free from monomeric, oligomeric or polymeric starting compounds used for the preparation of the water-soluble, crosslinkable polymer, and/or free from by-products formed during the preparation of the water-soluble, crosslinkable polymer, is prepared in step a) and used further. This essentially aqueous solution is particularly preferably a purely aqueous solution or a solution in an artificial tear fluid as described above. It is furthermore preferred for the crosslinking process to be carried out without addition of a comonomer, for example a vinylic comonomer.

Owing to the abovementioned measures and in particular owing to a combination of said measures, the crosslinking process is carried out using a solution of the water-soluble, crosslinkable polymer containing no or essentially no undesired constituents requiring extraction after crosslinking. It is therefore a particular feature of this preferred embodiment of the crosslinking process that extraction of undesired constituents is not necessary after the crosslinking.

The crosslinking process is therefore preferably carried out in such a way that the essentially aqueous solution of the water-soluble polymer comprising crosslinkable groups is free or essentially free from undesired constituents, in particular from monomeric, oligomeric or polymeric starting compounds used for the preparation of the water-soluble, crosslinkable polymer, or from by-products formed during the preparation of the water-soluble, crosslinkable polymer, and/or that the solution is used without addition of a comonomer.

An addition which may be added to the solution of the water-soluble, crosslinkable polymer is a photoinitiator for the crosslinking so long as an initiator is necessary for crosslinking of the crosslinkable groups. This may be the case, in particular, if the crosslinking takes place by photocrosslinking, which is preferred in the novel process.

In the case of photocrosslinking, it is expedient to add an initiator which is capable of initiating free-radical crosslinking and is readily soluble in water. Examples thereof are known to the person skilled in the art; suitable photoinitiators which may be mentioned specifically are benzoins, such as benzoin, benzoin ethers, such as benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal, anthraquinones, such as 2-methylanthraquinone, 2-ethylanthraquinone, 2-tert-butylanthraquinone, 1-chloroanthraquinone and 2-amylanthraquinone; furthermore triphenylphosphine, benzoylphosphine oxides, for example 2,4,6-trimethylbenzoyl-diphenylphosphine oxide, benzophenones, such as benzophenone and 4,4'-bis(N,N'-dimethylamino) benzophenone; thioxanthones and xanthones; acridine derivatives; phenazine derivatives; quinoxaline derivatives and 1-phenyl-1,2-propanedione 2-O-benzoyl oxime; 1-aminophenyl ketones and 1-hydroxyphenyl ketones, such as 1-hydroxycyclohexylphenyl ketone, phenyl 1-hydroxyisopropyl ketone, 4-isopropylphenyl 1-hydroxyisopropyl ketone, 2-hydroxy-1-[4-(2-hydroxyethoxy)phenyl]-2-methylpropan-1-one, 1-phenyl-2-hydroxy-2-methylpropan-1-one, and 2,2-dimethoxy-1,2-diphenylethanone, all of which are known compounds.

Particularly suitable photoinitiators, which are usually used with UV lamps as light source, are acetophenones, such as 2,2-dialkoxybenzophenones and hydroxyphenyl ketones, in particular the initiators known under the trade names IRGACURE®2959 and IRGACURE®1173.

Another class of photoinitiators usually employed when argon ion lasers are used are benzil ketals, for example benzil dimethyl ketal.

The photoinitiators are added in effective amounts, expediently in amounts of from about 0.3 to about 2.0% by weight, in particular from 0.3 to 0.5% by weight, based on the total amount of the water-soluble, crosslinkable polymer.

The resultant solution can be introduced into a mould using methods known per se, such as, in particular, conventional metering, for example dropwise. The novel contact lenses can be produced in a manner known per se, for example in a conventional spin-casting mould, as described, for example, in U.S. Pat. No. 3,408,429, or by the full-mould process in a static mould, as described, for example, in U.S. Pat. No. 4,347,198. Appropriate moulds are made, for example, of polypropylene. Examples of suitable materials for reusable moulds are quartz and sapphire glass.

The water-soluble, crosslinkable polymers which are suitable in accordance with the invention can be crosslinked-by irradiation with ionizing or actinic radiation, for example electron beams, X-rays, UV or VIS light, ie. electromagnetic radiation or particle radiation having a wavelength in the range from about 280 to 650 nm. Also suitable are UV lamps, He/Cd, argon ion or nitrogen or metal vapour or NdYAG laser beams with multiplied frequency. It is known to the person skilled in the art that each selected light source requires selection and, if necessary, sensitization of the suitable photoinitiator. It has been recognized that in most cases the depth of penetration of the radiation into the water-soluble, crosslinkable polymer, crosslinkable polymer and the rate are in direct correlation with the absorption coefficient and concentration of the photoinitiator.

If desired, the crosslinking can also be initiated thermally. It should be emphasized that the crosslinking can take place in a very short time in accordance with the invention, for example in less than five minutes, preferably in less than one minute, in particular in up to 30 seconds, particularly preferably as described in the examples.

Apart from water, which is preferred, the crosslinking medium can additionally be any medium in which the crosslinkable polymer is soluble. In the case of polyvinyl alcohol as the principal polymer backbone and accordingly the polyvinyl alcohol/azalactone system, all solvents which dissolve polyvinyl alcohol are suitable, such as alcohols, for example ethanol, glycols, glycerol, piperazine (at elevated temperature), diamines, such as triethylenediamine, formamide, dimethylformamide, hexamethylphosphoric triamide, dimethyl sulfoxide, pyridine, nitromethane, acetonitrile, nitrobenzene, chlorobenzene, trichloromethane, dioxane and aqueous solutions of tetraalkylammonium bromide and iodide.

The opening of the mould so that the moulding can be removed can be carried out in a manner known per se. Whereas the process proposed in the prior art (U.S. Pat. No. 3,408,429 and 4,347,198) requires subsequent purification steps at this point, for example by extraction, and also steps for hydration of the resultant mouldings, in particular contact lenses, such steps are unnecessary here.

Since the solution of the water-soluble, crosslinkable polymer preferably comprises no undesired low-molecular-weight constituents, the crosslinked product also comprises no such constituents. Subsequent extraction is therefore unnecessary. Since the crosslinking is carried out in an essentially aqueous solution, subsequent hydration is unnecessary. These two advantages mean, inter alia, that complex subsequent treatment of the resultant mouldings, in particular contact lenses, is unnecessary. The contact lenses obtainable by the crosslinking process are therefore distinguished, in an advantageous embodiment, by the fact that they are suitable for their intended use without extraction. The term 'intended use' in this connection is taken to mean, in particular, that the contact lenses can be employed in the human eye. The contact lenses obtainable by the crosslinking process are furthermore distinguished in an advantageous embodiment by the fact that they are suitable for their intended use without hydration.

This process therefore proves to be extremely suitable for the efficient production of a large number of mouldings, such as contact lenses, in a short time. The contact lenses obtainable by this process have, inter alia, the advantages over the contact lenses known from the prior art that they can be used as intended without subsequent treatment steps, such as extraction or hydration.

The examples below serve to illustrate the invention. In the examples, unless expressly stated otherwise, amounts are by weight and temperatures are given in degrees Celsius. Examples are not suitable for restricting the invention, for example to the scope of the examples.

EXAMPLE 1

10.0 g of Mowiol 4-98 (Hoechst AG) were dissolved in 40 ml of DMSO at 65° C. with stirring. 0.2 g of the catalyst 1,8-diazabicyclo[5.4.0]undec-7-ene (DBU, Fluka) was then added, followed by 0.92 g (6.6 mmol, corresponding to 3 mol% relative to the OH groups of the PVA) of 2-vinyl-4, 4-dimethylazalactone (SNPE-Toulouse). The mixture was allowed to react at 65° C. for 24 hours with vigorous stirring. The mixture then contained no free azalactone, which was verified by the absence of the IR band at 1820 $cm^{-1}$. After cooling, the solution was transferred into a dropping funnel, and the modified polymer was precipitated by dropwise introduction into 1 liter of acetone with vigorous stirring using an Ultraturax. The solid was isolated by centrifugation and re-dissolved in 100 ml of water. Precipitation of this solution in acetone/EtOH 2/1 as described above, centrifugation and drying for 2 days at room temperature are under a high vacuum gave the product (water-soluble, crosslinkable polymer) as a white powder in a yield of 10.11 g (93%). The $^1$H-NMR (in DMSO-$d_6$) shows that about 2.5% of the OH groups of PVA had reacted (relative integration of the —OH in PVA to the olefin H in acrylamide).

3.5 g of this modified PVA together with 30 mg of Irgacure®2959 (Ciba-Geigy AG) as photoinitiator were dissolved in 6.5 g of water with a gentle warming, the mixture was filtered through a 0.45 µm Teflon filter, and the filtrate was centrifuged directly in a plastic syringe (in order to eliminate air bubbles). In each case, one drop of this solution was introduced into a female contact-lens mould made from polypropylene or quartz, the mould was closed, and the polymer was irradiated for 10 seconds under a Hönle Hg lamp (flux without filter set to 80 mW/$cm^2$ using a Hönle 254 nm Powermeter) at a distance of 20 cm with a 305 nm cut-off filter. The lenses were removed from the mould and autoclaved at 121° C. for 30 minutes in a buffer solution, giving transparent, dimensionally stable, tear-resistant, soft contact lenses having a water content of 65.5% and a refractive index $n_D^{20}$=1.396.

EXAMPLE 2

10.0 g of Mowiol 8-88 or 4-88 were reacted as in Example 1 with 0.74 g (5.3 mmol) of 2-vinyl-4,4-dimethylazalactone and 0.2 g DBU in 40 ml of DMSO for 24 hours at 65° C., and the product was purified by precipitation in acetone and reprecipitation in water acetone/EtOH 2/1, isolated and dried (yield 82%). According to the $^1$H-NMR, the degree of reaction of the free OH groups of the PVA was 3.3%. Crosslinking in 35% aqueous solution containing 0.3% of Irgacure® 2959 as photoinitiator gave transparent, dimensionally stable, tear-resistant, soft contact lenses having a water content of 66.7% and a refractive index $n_D^{20}$=1.393.

EXAMPLE 3

5.0 g of Mowiol 8-88 were reacted as in Example 1 with 1.10 g (7.9 mmol) of 2-vinyl-4,4-dimethylazalactone and 0.1 g of DBU in 20 ml of DMSO for 24 h at 65° C. and the product was purified by precipitation in acetone and reprecipitation in water, acetone/EtOH 2/1, isolated and dried (yield 57%). According to the $^1$H-NMR, the degree of reaction of the free OH groups of the PVA was 8.5%. Crosslinking as a 30% solution in DMSO or water containing 0.5% of Irgacure®2959 as photoinitiator gave transparent, dimensionally stable, tear-resistant, soft contact lenses having a water content of 76% (crosslinked in DMSO) or 78% (crosslinked in water).

EXAMPLE 4(PRODUCTION OF CONTACT LENSES BY EXPOSURE IN WATER)

A 35% aqueous solution of the water-soluble, crosslinkable polymers shown in Table 1 below is mixed with 0.3%

(based on the polymer content) of the photoinitiator Irgacure®2959. The solution is exposed for 10 seconds in a quartz mould (transparent contact-lens mould) using a Hönle lamp.

TABLE 1

| | crosslinkable polymer | | |
|---|---|---|---|
| Ex. No. | Mowiol product | Azalactone content | Water content |
| 1 | 4-98 | 3% | 65.5% (±0.5) |
| 2 | 4-88 | 3% | 68.6% (±0.8) |
| 2 | 8-88 | 3% | 66.7% (±0.8) |
| 2 | 4-88 | 4,5% | 59.9% (±1.1) |
| 2 | 8-88 | 4,5% | 60.6% (±0.5) |

The lenses are removed from the mould and washed with water. They are then sterilized for 30 minutes at 120° C. in an autoclave, giving transparent lenses having the water content shown in Table 1 which are dimensionally stable, comfortable to wear, non-cytotoxic and have very good mechanical properties, slipperiness and rigidity.

EXAMPLE 5 (PRODUCTION OF CONTACT LENSES BY EXPOSURE IN A DMSO SOLUTION)

A 30% solution of the water-soluble, crosslinkable polymers shown in Table 2 below is mixed in DMSO with 0.5% (based on the polymer content) of the photoinitiator Irgacure®2959 in a contact-lens mould and exposed as shown in Table 2.

TABLE 2

| | Crosslinkable polymer | | | |
|---|---|---|---|---|
| Ex. No. | Mowiol product | Azalactone content | Exposure time/sec. | Water content |
| 1 | 4-98 | 12% | 10 | ~69% |
| 1 | 4-98 | 9% | 10 | ~70% |
| 2 | 4-88 | 8% | 10 | ~76% |
| 2 | 8-88 | 3–6% | 20 | ~80% |

The lenses are removed from the mould and washed with water. They are then sterilized for 30 minutes at 120° C. in an autoclave, giving transparent, clear, dimensionally stable, tear-resistant, soft lenses having the water content shown in Table 2.

What is claimed is:

1. A process for the production of mouldings, which comprises the following steps:

a) preparing an aqueous solution of a water-soluble, crosslinkable polymer comprising crosslinkable units of the formula III or IIIA

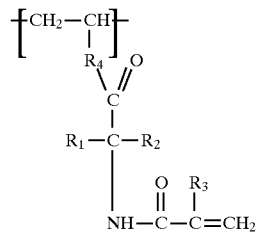

(III)

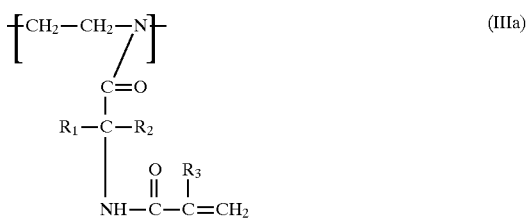

(IIIa)

in which
R$_1$ and R$_2$ are amino acid radicals and are, independently of one another, hydrogen, a C$_1$–C$_8$ alkyl group, an aryl group, or a cyclohexyl group, where these groups are unsubstituted, monosubstituted or polysubstituted;
R$_3$ is hydrogen or a C$_1$–C$_4$ alkyl group, and
R$_4$ is an —O— or —NH— bridge, b) introducing the aqueous solution into a mould,
   c) crosslinking water-soluble, crosslinkable polymer solution in the mould, and
   d) opening of the mould so that the moulding can be removed.

2. A process according to claim 1, wherein the moulding is a contact lens.

3. A process according to claim 1, wherein the aqueous solution of the water-soluble, crosslinkable polymer of the formula III or IIIa is free or essentially free from undesired constituents including monomeric, oligomeric or polymeric starting compounds used for the preparation of the water-soluble, crosslinkable polymer, and byproducts formed during the preparation of the crosslinkable polymer.

4. A process according to claim 1, wherein the aqueous solution of the water-soluble, crosslinkable polymer comprising units of the formula III or IIIa is used without addition of a comonomer.

5. A process according to claim 1, wherein a crosslinking initiator is added to the solution of the water-soluble crosslinkable polymer.

6. A process according to claim 1, wherein the crosslinking step is not followed by an extraction step that removes undesired constituents.

7. A process for producing a moulding, which comprises the following steps:

a) preparing an aqueous solution of a water-soluble, crosslinkable polymer comprising units of the formula III or IIIa,

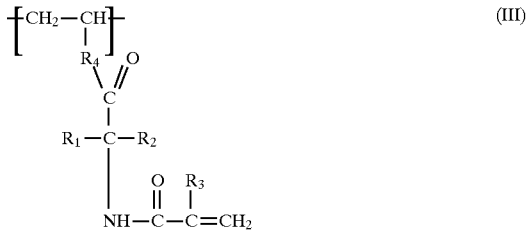

(III)

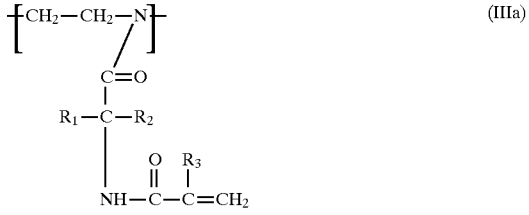

(IIIa)

in which
R$_1$ and R$_2$ are amino acid radicals and are, independently of one another, hydrogen, a C$_1$–C$_8$ alkyl group, an aryl group, or a cyclohexyl group, where these groups are unsubstituted, monosubstituted or polysubstituted;
$R_3$ is hydrogen or a $C_1$–$C_4$alkyl group, and
$R_4$ is an —O— or —NH— bridge,
wherein the aqueous solution is free or essentially free from undesired constituents including monomeric, oligomeric or polymeric starting compounds used for the preparation of the water-soluble, crosslinkable polymers, and byproducts formed during the preparation of the water-soluble, crosslinkable polymer, and the aqueous solution is used without addition of a comonomer, b) introducing the aqueous solution into a mould,
c) crosslinking the water-soluble, crosslinkable polymer in the mould to form the moulding, and
d) removing the moulding.

8. A process according to claim 7, wherein the moulding is a contact lens.

9. A process for the production of a contact lens according to claim 8, wherein the aqueous solution is a purely aqueous solution or a solution in an artificial tear fluid.

10. A process for the production of a contact lens according to claim 8, wherein a crosslinking initiator is added to the solution, and the crosslinking is carried out by photocrosslinking.

11. A moulding, obtainable by a process according to claim 1.

12. A moulding according to claim 11, wherein the moulding is suitable without extraction for its intended use.

13. A contact lens obtainable according to one of claim 8, which is suitable without extraction for its intended use.

14. A water-soluble, crosslinkable polymer which is a derivative of a polyvinyl alcohol, polyethyleneimine or polyvinylamine having a mean molecular weight of at least about 2000 which comprises from about 0.5 to about 80%, based on the number of hydroxyl groups in the polyvinyl alcohol or the number of imine or amine groups, of units of the formula III or IIIa $$\left[ \begin{array}{c} CH_2-CH \\ | \\ R_4 \\ \diagdown \diagup O \\ C \\ | \\ R_1-C-R_2 \\ | \\ \underset{NH-C-C=CH_2}{\overset{O\ \ R_3}{\underset{||\ \ |}{}}} \end{array} \right]_o \quad \text{(III)}$$

$$\left[ \begin{array}{c} CH_2-CH_2-N \\ \diagup \\ C=O \\ | \\ R_1-C-R_2 \\ | \\ \underset{NH-C-C=CH_2}{\overset{O\ \ R_3}{\underset{||\ \ |}{}}} \end{array} \right] \quad \text{(IIIa)}$$

in which
$R_1$ and $R_2$ embody amino acid radicals and are, independently of one another, hydrogen, a $C_1$–$C_8$alkyl group, an aryl group, or a cyclohexyl group, where these groups are unsubstituted, monosubstituted or polysubstituted;
$R_3$ is hydrogen or a $C_1$–$C_4$alkyl group, in particular a $CH_3$ group, and
$R_4$ is an —O— or —NH— bridge.

15. A water-soluble, crosslinkable polymer according to claim 14, which is a derivative of a polyvinyl alcohol having a molecular weight of at least about 2000 which comprises from about 0.5 to 80%, based on the number of hydroxyl groups in the polyvinyl alcohol, of units of the formula IIIb $$\left[ \begin{array}{c} CH_2-CH \\ | \\ O \\ \diagdown \diagup O \\ C \\ | \\ R_1-C-R_2 \quad R_3 \\ | \qquad\qquad | \\ NH-CO-C=CH_2 \end{array} \right] \quad \text{(IIIb)}$$

in which the symbols $R_1$, $R_2$ and $R_3$ are as defined in claim 14.

16. A water-soluble, crosslinkable polymer according to claim 15, in which $R_1$ and $R_2$ are methyl and $R_3$ is hydrogen.

17. A water-soluble, crosslinkable polymer according to claim 14, which is a derivative of a polyvinyl alcohol, polyethyleneimine or polyvinylamine having a molecular weight of at least about 2000 which comprises from about 1 to 15%, based on the number of hydroxyl groups or imine groups or amine groups in the polyvinyl alcohol, polyethyleneimine or polyvinylamine respectively, of units of the formula III or IIIa.

18. A water-soluble, crosslinkable polymer according to claim 14 in essentially pure form.

19. A crosslinked polymer obtainable by photocrosslinking a water-soluble, crosslinkable polymer according to claim 14 in the presence or absence of an additional vinylic comonomer.

20. A crosslinked polymer, obtained by photocrosslinking a water-soluble, crosslinkable copolymer according to claim 14 in essentially pure form in the presence or absence of an additional vinylic comonomer.

21. A crosslinked copolymer according to claim 20, where the water-soluble, crosslinkable polymer is converted into essentially pure form by single or repeated ultrafiltration.

22. A crosslinked polymer, obtainable by photocrosslinking a water-soluble, crosslinkable polymer according to claim 14 in the absence of an additional vinylic comonomer.

23. A crosslinked polymer obtainable by photocrosslinking a water-soluble, crosslinkable polymer according to claim 14 in the presence of from 0.5 to 80 units of an additional vinylic comonomer per unit of the formula III or IIIa.

24. A process for the preparation of a crosslinked polymer, which process comprises photocrosslinking a water-soluble, crosslinkable polymer according to claim 14 in the presence or absence of an additional vinylic comonomer.

25. A process according to claim 24, wherein the water-soluble, crosslinkable polymer is employed in essentially pure form.

26. A process according to claim 25, wherein the water-soluble, crosslinkable polymer is converted into essentially pure form by single or repeated ultrafiltration.

27. A process according to claim 24, wherein the photocrosslinking is carried out in solution.

28. A process according to claim 24, wherein the photocrosslinking is carried out in an organic solution in which the water-soluble, crosslinkable polymer is dissolved.

29. A process according to claim 28, wherein the photocrosslinking is carried out in DMSO.

30. A moulding comprising a crosslinked polymer according to claim 19.

31. A moulding according to claim 30, which is a contact lens.

32. A process for the production of a moulding, which process comprises photocrosslinking a water-soluble, crosslinkable polymer according to claim 14 in a closed mould in the presence or absence of an additional vinylic comonomer.

33. A process for the production of a contact lens, which process comprises photocrosslinking a water-soluble, crosslinkable polymer according to claim 14 in a closed contact-lens mould by the full-mould process in the presence or absence of an additional vinylic comonomer.

* * * * *